United States Patent
Feinaeugle et al.

(10) Patent No.: US 10,469,284 B2
(45) Date of Patent: Nov. 5, 2019

(54) INTEGRATED ARRANGEMENT HAVING AN ELECTRICAL VOLTAGE SUPPLY AND A COMMUNICATION INTERFACE

(71) Applicant: Balluff GmbH, Neuhausen (DE)

(72) Inventors: Albert Feinaeugle, Wildberg (DE); Roland Schaefer, Rottweil (DE)

(73) Assignee: Balluff GmbH, Neuhausen (DE)

( * ) Notice: Subject to any disclaimer, the term of this patent is extended or adjusted under 35 U.S.C. 154(b) by 0 days.

(21) Appl. No.: 16/121,819

(22) Filed: Sep. 5, 2018

(65) Prior Publication Data

US 2019/0074993 A1    Mar. 7, 2019

(30) Foreign Application Priority Data

Sep. 6, 2017  (DE) .................. 10 2017 120 483

(51) Int. Cl.
*H04L 12/40*    (2006.01)
*G05B 19/042*   (2006.01)
(Continued)

(52) U.S. Cl.
CPC .... *H04L 12/40006* (2013.01); *G05B 19/0425* (2013.01); *G06F 13/122* (2013.01);
(Continued)

(58) Field of Classification Search
CPC .. G06F 13/122; G06F 13/126; G06F 13/4221; G06F 12/40169; G06F 12/44;
(Continued)

(56) References Cited

U.S. PATENT DOCUMENTS 8,713,226 B2    4/2014   Graff
2006/0233000 A1* 10/2006 Akagi ................. H02M 5/4585
                                                363/37
(Continued)

FOREIGN PATENT DOCUMENTS

DE    10 2006 030 706 A1    1/2008
DE    10 2009 013 303 A1    9/2010
(Continued)

OTHER PUBLICATIONS

IEC 61131-9, International Standard, "Programmable controllers—Part 9: Single-drop digital communication interface for small sensors and actuators (SDCI)," Edition 1.0, Sep. 2013, total of 576 pages.
(Continued)

*Primary Examiner* — Henry Tsai
*Assistant Examiner* — John B Roche
(74) *Attorney, Agent, or Firm* — Collard & Roe, P.C.

(57) ABSTRACT

In an arrangement of an electrically communicative voltage supply for controlled operation of at least one electrically operable IO-Link device using an electrical DC voltage provided by a voltage supply unit as well as an IO-Link communication interface which is provided for the controlled operation of the at least one IO-Link device and formed with at least one channel, the IO-Link communication interface which is formed with at least one channel and the voltage supply unit form a structural unit and the IO-Link communication interface includes an IO-link master providing a gateway function.

9 Claims, 2 Drawing Sheets

(51) Int. Cl.
*G06F 13/12* (2006.01)
*G06F 13/42* (2006.01)
*H04L 12/44* (2006.01)
*H04L 12/66* (2006.01)

(52) U.S. Cl.
CPC ........ *G06F 13/126* (2013.01); *G06F 13/4221* (2013.01); *H04L 12/40169* (2013.01); *H04L 12/44* (2013.01); *H04L 12/66* (2013.01); *H04L 2012/4026* (2013.01)

(58) Field of Classification Search
CPC . G06F 12/66; G06F 12/4006; G05B 19/0425; H04L 2012/4026
See application file for complete search history.

(56) References Cited

U.S. PATENT DOCUMENTS

| | | | |
|---|---|---|---|
| 2012/0230076 A1* | 9/2012 | Palmer | H03K 17/0828 363/132 |
| 2015/0134856 A1 | 5/2015 | Feinaeugle | |
| 2015/0187237 A1* | 7/2015 | Hall | G09F 9/3023 362/249.01 |
| 2016/0132617 A1* | 5/2016 | Liu | G06F 17/5009 703/2 |
| 2017/0264455 A1* | 9/2017 | Ozaki | G05B 19/054 |

FOREIGN PATENT DOCUMENTS

| | | |
|---|---|---|
| DE | 10 2009 033 691 B3 | 12/2010 |
| DE | 10 2011 003 309 A1 | 8/2012 |
| DE | 10 2012 009 494 A1 | 11/2013 |
| GB | 2 442 304 A | 4/2008 |
| GB | 2442304 A * | 4/2008 ......... H04L 12/4625 |

OTHER PUBLICATIONS

German Search Report in DE 10 2017 120 483.0, dated Apr. 18, 2018, with English translation of relevant parts.

German Office Action dated Apr. 18, 2018 in German Application No. 10 2017 120 483.0 with English translation of the relevant parts.

* cited by examiner

INTEGRATED ARRANGEMENT HAVING AN ELECTRICAL VOLTAGE SUPPLY AND A COMMUNICATION INTERFACE

CROSS REFERENCE TO RELATED APPLICATIONS

Applicant claims priority under 35 U.S.C. § 119 of German Application No. 10 2017 120 483.0 filed Sep. 6, 2017, the disclosure of which is incorporated by reference.

BACKGROUND OF THE INVENTION

1. Field of the Invention

The invention relates to an arrangement having an electrical voltage supply as well as a communication interface formed with at least one channel.

2. Description of the Related Art

So-called "IO-Link" connections have been used more recently for connecting industrial terminal devices to, for example, fieldbus modules. Such an IO-Link as well as a method and a control means for operating such an IO-Link are known from DE 10 2012 009 494 A1. As described there, the fieldbus modules take on the role of an IO-Link master. For example, sensors, actuators, display devices, operating devices, including drives on machines, are considered to be terminal devices, referred to as "IO-Link devices" in the following.

In many industrial assembly systems, the space required for wiring and for the switch cabinets for electrical installation exceeds the available installation space. Here, the costs for the working time and the material expenditure during installation of system parts for signal transmission to the respective industrial machines frequently surpass the acquisition costs of the attached sensors and actuators.

In order to address this problem, a consortium of concerned manufacturers has specified a standard for an intelligent sensor/actuator interface having the above-mentioned designation "IO-Link" which is standardized as an international open standard by the standard IEC 61131-9. Accordingly, said IO-Link devices are described via description files IODD, IO-Link Device Description.

Such an IO-Link provides a serial point-to-point connection for the signal transmission between sensors and actuators and the IO level of the machine. In principle, an IO-Link transfers data between a specific IO-Link master and an attached IO-Link device as a slave. The power supply of the attached IO-link devices, i.e. sensors, actuators or combination devices thereof, takes place advantageously with an IO-link on an individual plug connector. Both fieldbus modules and programmable logic controller (PLC) interface assemblies are available as IO-Link masters.

Additionally, such an IO-Link is backward compatible with binary standard sensors and uses consistently unshielded three- or five core-standard lines. While the fieldbus level is responsible for linking individual machines or their components to the control of the system, the IO-link is to be assigned to the machine level or sensor actuator level. The fieldbus level includes most of the standardized fieldbuses as they are generally used in machine construction and plant construction.

SUMMARY OF THE INVENTION

The invention is based on the idea that, in the past, the above-mentioned IO-Link communication systems were initially used primarily for communication with sensors, but in the meantime were increasingly also used for controlling actuators such as, for example, electrical drives, electro-pneumatic drives, valve terminals, hydraulic control valves, electric grippers or the like.

In order to also be able to use a said communication system in the field of actuators, master ports of type B are provided in the IO-Link specification, having their own potential-isolated voltage or power supply of the actuators, said voltage or power supply being arranged on a single plug connector. However, many actuators, e.g. drives for format adjustment or grippers, require relatively high electrical supply currents in the range of 4 A and higher. For an e.g. four channel IO-link master for operating four above-mentioned drives, a total current of at least 16 A would therefore have to be made available, which is not possible with a conventional ⅞-inch plug, because these are only specified with a maximum current of 9 A. Thus, a simultaneous operation, in particular a 100% simultaneous operation, is not possible with the above-mentioned four drives by means of a single IO-Link master. This problem is even more significant with IO-Link masters having even more channels, e.g. with an 8-port master.

The above-mentioned relatively high supply currents arise, e.g., in drives or actuators used in the packaging industry for the purpose of automated format changeover/change. Such format changeovers relate to, for example, production systems having frequent changes in batch sizes or frequent product changes which necessitate a fast change-over of the production systems or machines to different formats. Such changeovers are usually connected to high energy consumption because a number of stops and guides must be adjusted. In addition, relatively long refitting times arise, and long machine downtimes connected to this.

The present invention is therefore based on the object of specifying an arrangement having an electrical voltage supply unit (AC/DC converter) as well as having an IO-Link communication interface with at least one channel, having an IO-Link master, by means of which said disadvantages of the prior art can be avoided and by means of which control of actuators can be enabled, in particular with an above-mentioned IO-Link communication system. Here, a said IO-Link master provides a gateway function, e.g. a gateway of a fieldbus system known per se to an IO-Link channel (or "port"). The "PROFINET" (process field network) bus system known per se, for example, or any other fieldbus system customary in the market are considered as fieldbus systems.

To solve said object, the integrated arrangement of a "communicative voltage supply", e.g. a voltage supply unit having an AC/DC converter unit, together with an IO-Link communication interface with least one channel, having a said gateway function provided by an IO-Link master, is proposed. Here, a corresponding "gateway" corresponds to a said IO-Link master and comprises at least one IO-Link communication interface assigned to an IO-Link interface.

In the arrangement according to the invention, it can be provided that the communication interface formed with at least one channel has at least one IO-Link master having at least one port for connection to at least one actuator, wherein the IO-Link master provides a gateway between a fieldbus system and an IO-Link communication system.

In the arrangement according to the invention it can also be provided that the voltage supply unit has an AC/DC converter equipped with power electronics, by means of which the at least one actuator is operated. With special power requirements of the actuators, the power electronics can be formed with, e.g., SiC transistors and/or with GaN transistors.

The fieldbus system and the IO-Link communication system can be connected by means of a wireless communication connection, whereby the spatial flexibility during the control of the actuators is significantly improved.

In the arrangement according to the invention, it can additionally be provided that the at least one IO-Link master comprises decentralized control functions and a data pre-processing device for relief of the central programmable logic controller (PLC) or also for standalone control of smaller machines or machine modules.

Furthermore, it can be provided that the at least one IO-Link master has a standardized diagnosis function of the at least one actuator, said diagnosis function being already provided in said "IO-Link" standard, and, advantageously enabled only by the integrated arrangement, also comprises, in particular, the voltage supply unit. Moreover, it can be provided that the at least one IO-Link master has a standardized parameterization function for parameterization of the at least one actuator and, in particular, also has the voltage supply unit for parameterization, which is only enabled by the integrated arrangement.

Here, the proposed "communicative voltage supply" can comprise a highly efficient AC/DC converter, by means of which the actuators are supplied with DC voltage as efficiently as possible. The AC/DC converter can be equipped with modern power semiconductors, in particular highly efficient and/or highly compact power electronics, e.g. fitted with SiC transistors or GaN transistors. The communication interface integrated in the proposed voltage supply preferably additionally comprises at least one IO-Link port of type B, e.g. a 4 channel or 8 channel port B IO-Link master.

The integrated or common arrangement of the AC/DC converter and the communication interface can be advantageously implemented in a single housing suitable for industrial use. In particular due to said highly-efficient AC/DC converter, the housing which is suitable for industrial use can be formed as a passively cooled housing fulfilling the technical requirements according to IP67 protection with regard to impermeability of dust and water.

Due to said integrated construction, several intelligent actuators, formed in particular as said IO-Link devices, can, for example, be attached via IO-Link and can be electrically operated or supplied without said problems, in particular with regard to the total current limitation on the IO-Link master.

A technically complex, wasteful cabling between a voltage supply unit and the IO-Link master, occupying additional space, can be effectively avoided by the invention. Thus, in a power supply unit according to the prior art, arranged in a switch cabinet, sufficient for IP20 protection, large electrical currents must be led over relatively wide distances. Compared with the approach according to the invention, a conventional cabling of the switch cabinet to the drives or actuators is disadvantageous due to the complex cabling, said current limitation, the energy loss and the space requirement (e.g. for the switch cabinet volume required for the installation).

Additionally, the invention enables technical or functional diagnoses to be carried out in a uniform manner both on the attached actuators and also on the voltage supply due to said integrated arrangement. Here, e.g., high voltages and low voltages or high temperatures both of the monitored actuators and also of the voltage supply can be uniformly diagnosed. Diagnosis values for, e.g., the "load level", the "stress level" or the "lifetime" of the voltage supply can be uniformly determined and made available.

The invention additionally enables the attached actuators or IO-Link devices as well as the voltage supply or converter unit to be parameterized both in a uniform manner and in a standardized manner by the IO-Link or to provide them with setting parameters.

Because only one housing is required according to the invention, instead of two housings, and thus the electrical connection between two device housings is eliminated, the mechanical assembly time and electrical assembly time are also significantly reduced. In addition to said lower switch cabinet volumes, there are also lower requirements for the air-conditioning of the switch cabinet, whereby corresponding energy savings arise.

BRIEF DESCRIPTION OF THE DRAWINGS

Exemplary embodiments of the invention are depicted in the drawings and described in more detail in the description below.

In the drawings.

DETAILED DESCRIPTION OF PREFERRED EMBODIMENTS

Figure 1:
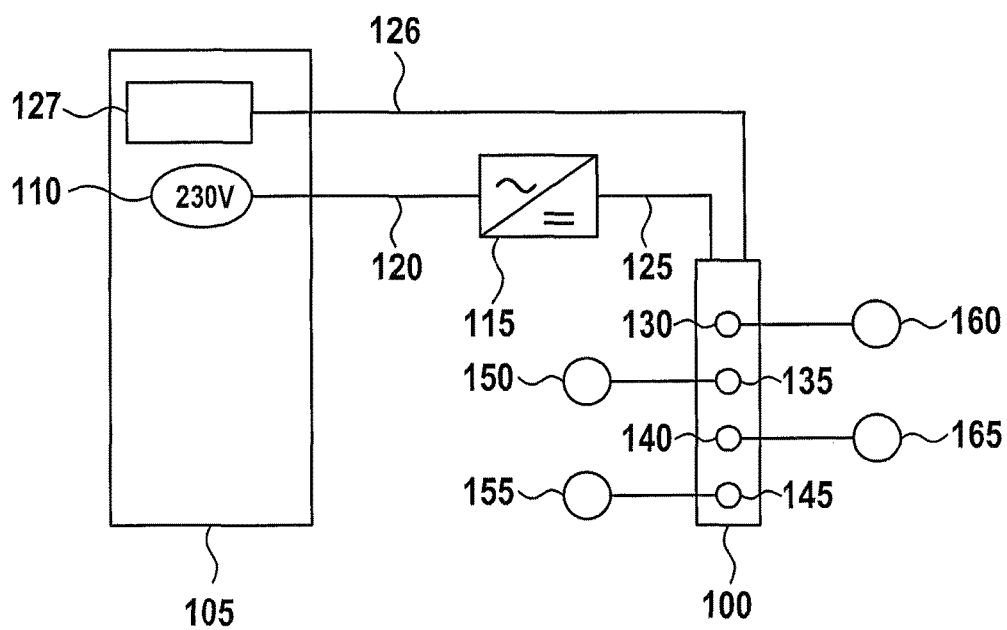
FIG. 1 shows a connection of a voltage supply unit to an IO-Link communication interface, said connection being established according to the prior art.

FIG. 1 shows an arrangement respectively circuitry arrangement according to the prior art, comprising a voltage supply 110, 115, an IO-Link master 100 having four ports of type B 130-145, as well as four IO-Link devices 150-165, e.g. IO-Link enabled drives, attached thereto. In the exemplary embodiment, the voltage supply comprises a switch cabinet 105 which provides an AC voltage source 110, having, e.g., 230 or 110 V. The corresponding AC voltage is assigned to an "IP67" switching power supply 115 arranged outside the switch cabinet, formed as a voltage supply unit, by means of which the AC voltage is converted into a lower DC voltage of, e.g., 24 v, in a manner known per se. The conversion of the AC voltage into the DC voltage takes place in a known manner by means of an AC/DC converter provided in the switching power supply 115.

The switching power supply 115 is connected to the AC voltage source 110 via an electrical line 120. The switching power supply 115 is connected to the IO-Link master 100 via an electrical line 125, via which said converted DC voltage is transmitted to the IO-Link master 100. The IO-Link master 100 is additionally connected via a control line 126 to a fieldbus interface 127 of a fieldbus system known per se, said fieldbus interface being arranged in the switch cabinet 105 in a data technical or communication technical manner.

Here, the communication of the IO-Link devices 150-165 with the IO-Link master 100 takes place in a manner known per se by means of the so-called IO-Link communication protocol.

However, with the circuit arrangement shown in FIG. 1, it is not possible to operate several or even all four drives simultaneously, because the currents required for this of four times 4 A are in principle not achievable for the reasons already named (⅞ inch plug maximum current of 9 A). In addition, this arrangement requires a relatively high installation effort for the two housings of the switching power supply 115 and the IO-Link master 100. Moreover, the cabling shown in FIG. 1 between the switching power supply 115 and the IO-Link master 100 is relatively complex and thus expensive and the entire arrangement occupies a relatively large amount of space and is relatively space-filling, respectively.

Figure 2:
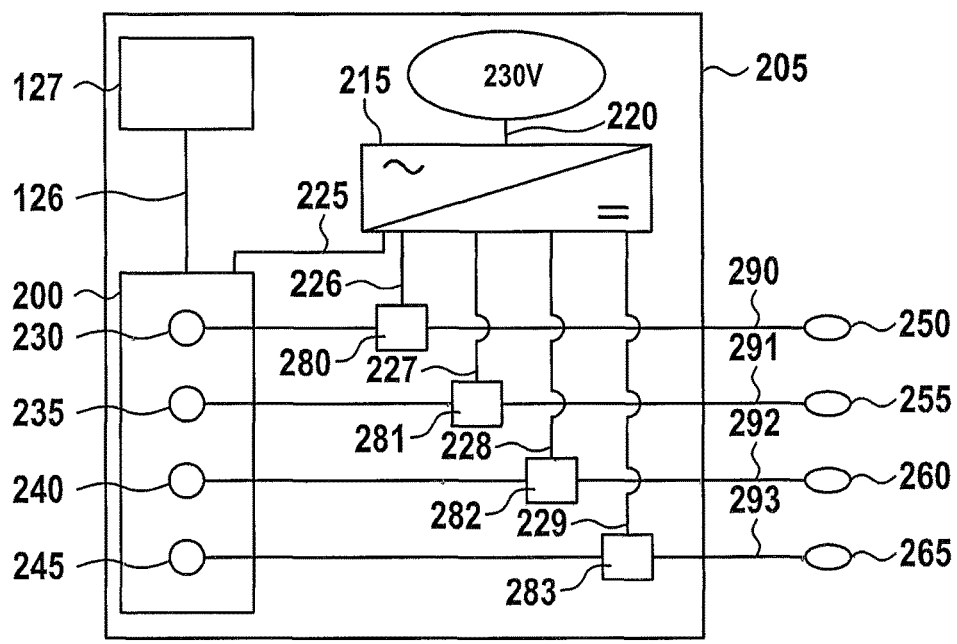
FIG. 2 shows an IO-Link communication interface established according to the invention having a workaround due to a current limitation.

FIG. 2 shows a possible workaround according to the prior art in cases in which a current supply via an IO-Link master is no longer possible, because the electrical total current exceeds said plug specification.

In the workaround, the switching current supply 215, which is shown in FIG. 1 as 115, is arranged in the switch cabinet 205. Correspondingly, the electrical line 220 and the IO-Link master 200, which are depicted in FIG. 1 as 120 and 100, respectively, are arranged in the switching cabinet 205. Only the voltage supply 225 of the IO-master remains unchanged. In the workaround, a link of data lines which extend from IO-Link ports 230-245 to voltage supply lines 226-229 takes place by means of clamps 280-283.

The also shown communication lines 290-293 thus represent complete IO-Link connections having an additional actuator supply which is provided via the voltage supply lines 226-229. The reference numerals 250-265 denote the IO-Link devices which can be sensors, actuators or devices having both of these functionalities.

Above all, in the arrangement shown in FIG. 2, the mostly large spatial distance which must be bridged by the communication lines 290-293 is disadvantageous. Additionally, the maximum line length of an IO-link is technically limited to approximately 20 m. Moreover, the technical installation effort for creating said links 280-283 as well as the increased switch cabinet volumes and optionally the increased expenditure for switch cabinet air conditioning required for this are significantly disadvantageous.

Figure 3:
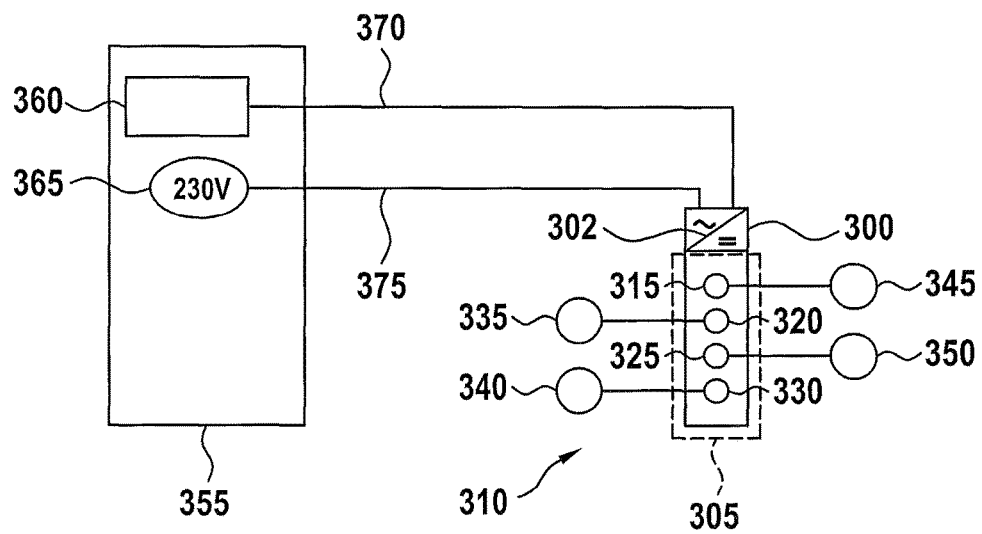
FIG. 3 shows a "communicative voltage supply" formed according to the invention as a structural unit, as an arrangement of a voltage supply unit (AC/DC converter) and an IO-Link communication interface.

In FIG. 3, an exemplary embodiment of a modified arrangement respectively circuit arrangement is shown. A said "communicative voltage supply" which is formed by the combination of a voltage supply unit 300 with an IO-Link communication interface 305 is depicted. In the exemplary embodiment, the voltage supply unit 300 comprises an AC/DC converter 302 for the electrical supply and the controlled operation of the four actuators 335-350 in the present example. The communication interface 305 and the electrical voltage supply unit 300 are formed as a structural unit and are accommodated in a single housing 310 in the exemplary embodiment. In the embodiment depicted, the housing 310 is formed as a passively cooled housing fulfilling the requirements of IP67 protection.

The communication interface 305 formed as an IO-Link communication system in the present example comprises a gate circuit presently having four ports 315-330. The four ports 315-330 are each connected to one of the actuators or IO-Link devices 335-350 shown in FIG. 3. In the present exemplary embodiment, the actuators 335-350 are drives which comprise motors equipped with intelligent drive electronics.

The voltage supply unit 300 of the "communicative voltage supply" has an AC/DC converter equipped with power electronics, wherein the power electronics in the present exemplary embodiment are already formed by the use of conventional Si-based transistors having a relatively high conversion efficiency of up to approximately 91% in order to enable the integrated arrangement according to the invention. It is thus possible to accommodate the voltage supply unit 300 as well as the IO-Link communication system 305 in the relatively small housing 310, especially with only passive cooling.

It should be noted that with relatively high power requirements on the part of the operated actuators for the voltage supply, the power electronics 302 can also be implemented using SiC or GaN transistor technology known per se in order to enable the desired use of a passive cooling by increased efficiency.

The arrangement accommodated in the housing 310 is, similarly to in FIG. 1, electrically connected to a switch cabinet 355 and to a fieldbus (system) or a corresponding fieldbus interface 360 as well as to an AC voltage source 365 arranged there which in turn supplies 230/110 V. Here, said AC/DC converter 302 is also electrically connected to the AC voltage source 365 via an electrical supply line 375. The relatively low currents required on the supply line 375, which can still be handled without problems with conventional or standard plug connectors, even in the case of an arrangement having eight actuators, are advantageous. The communication interface 305 is connected to the fieldbus 360 by means of a data or control line 370 in a data technical or communication technical manner.

In the present exemplary embodiment, the communication interface 305 formed with four channels comprises an IO-Link master having four ports 315-330 for connection to the actuators 335-350, wherein the IO-Link master provides a gateway between the fieldbus system 360 and the IO-Link communication system 305, 315-350. The fieldbus system 360 and the IO-Link communication 305 can be connected to one another in a data technical manner via wireless communication connection, whereby the flexibility is significantly increased with the spatial arrangement of the IO-Link communication system 305. The physical fieldbus connection by means of the data line or control line 370 hereby becomes a wireless communication connection.

The IO-Link master can comprise a programmable logic controller (PLC) for providing decentralized control functions for the operated actuators or IO-Link devices. The IO-Link devices 335-350 can be sensors, actuators or even devices having combined sensor and actuator function. Thanks to its PLC functionality, the IO-Link master can thus take on the control of machines whose sensors and actuators are represented by IO-Link devices 335-350 in a fully self-sufficient manner. The decentralized control of machine modules with simultaneous exchange of control information with a central machine control is also possible.

Additionally, the IO-Link master can comprise a diagnosis function for carrying out diagnoses of the at least one actuator and, in particular, of the voltage supply unit 300 in the same uniform manner standardized by IO-Link. The IO-Link master can also comprise a parameterization function for parameterization of the at least one actuator and optionally also the voltage supply unit 300.

Although only a few embodiments of the present invention have been shown and described, it is to be understood that many changes and modifications may be made thereunto without departing from the spirit and scope of the invention.

What is claimed is:

1. An arrangement of a communicative voltage supply for controlled operation of at least one electrically operable IO-link device, by means of an electrical DC voltage provided by a voltage supply unit as well as an IO-link communication interface which is provided for the controlled operation of the at least one IO-link device and is formed with at least one channel, wherein the IO-link communication interface formed with at least one channel and the voltage supply unit are formed as a structural unit and the IO-link communication interface comprises an IO-link master providing a gateway function, and wherein the voltage supply unit and the IO-link communication interface formed with at least one channel are accommodated in a single housing.

2. The arrangement according to claim 1, wherein the communication interface formed with at least one channel has at least one IO-link master having at least one port for connection to the at least one IO-link device, wherein the IO-Link Master provides a gateway between a fieldbus system and an IO-Link communication system.

3. The arrangement according to claim 1, wherein the voltage supply unit has an AC/DC converter equipped with power electronics.

4. The arrangement according to claim 3, wherein the power electronics are formed with Silicon Carbide transistors and/or with Gallium Nitride transistors.

5. The arrangement according to claim 2, wherein the fieldbus system and the IO-Link communication system are connected by means of a wireless communication connection.

6. The arrangement according to claim 2, wherein the at least one IO-Link master comprises a programmable logic controller (PLC) for detecting sensor signals of the at least one IO-Link device and/or the decentralized control of the at least one IO-Link device.

7. The arrangement according to claim 2, wherein the at least one IO-Link master comprises a diagnostic function for carrying out diagnoses of the at least one IO-Link device and/or the voltage supply unit.

8. The arrangement according to claim 2, wherein the at least one IO-Link master comprises a parameterization function for parameterization of the at least one IO-Link device and/or the voltage supply unit.

9. The arrangement according to claim 1, wherein the housing is formed as a passively cooled housing which fulfills the requirements of the IP67 protection class.

* * * * *